United States Patent [19]
Gore et al.

[11] Patent Number: 5,733,410
[45] Date of Patent: Mar. 31, 1998

[54] LABELING APPARATUS FOR APPLYING LABELS WITH A ROLLING MOTION

[75] Inventors: Kiron Gore, Libertyville, Ill.; Steven Lustig, Atlanta; Robert A. Charles, Lawrenceville, both of Ga.

[73] Assignee: Motorola, Inc., Schaumburg, Ill.

[21] Appl. No.: 659,970

[22] Filed: Jun. 3, 1996

[51] Int. Cl.⁶ .................................................. B32B 31/00
[52] U.S. Cl. ...................... 156/556; 156/542; 156/DIG. 2; 156/566
[58] Field of Search ........................ 156/556, 571, 156/572, 541, 542, DIG. 2, DIG. 42, 583.8, 583.9, 566, 442

[56] References Cited

U.S. PATENT DOCUMENTS

| | | | |
|---|---|---|---|
| 3,399,097 | 8/1968 | Vissage | 156/583.9 |
| 3,450,586 | 6/1969 | Caulford et al. | 156/571 X |
| 3,666,603 | 5/1972 | Kuhns et al. | 156/583.9 |
| 4,004,503 | 1/1977 | Dwyer | 156/583.9 X |
| 4,547,255 | 10/1985 | Yow | 156/583.8 X |
| 5,470,420 | 11/1995 | Yokajty et al. | 156/566 |

FOREIGN PATENT DOCUMENTS

| 2033324 | 7/1972 | Germany | 156/542 |
|---|---|---|---|

*Primary Examiner*—James Engel
*Attorney, Agent, or Firm*—Kelly A. Gardner; Ken Massaroni

[57] ABSTRACT

A labeling head (22) has an applicator surface (24) having an outward curvature for holding a label (12) and applying it to a labeling surface (16) of an article (14). The labeling head is rotatable about a pivot pin (38) which passes through a pivot end (28) of the labeling head, allowing a free end (26) of the labeling head to be biased toward the article at an initial angle of bias, as determined by, for example, an adjustment screw (40). The initial angle of bias and the curvature of the labeling head are such that the portion of the label nearest the free end is parallel to the labeling surface. As the labeling head is lowered, the label is applied with a substantial rolling motion to avoid trapped air bubbles.

12 Claims, 3 Drawing Sheets

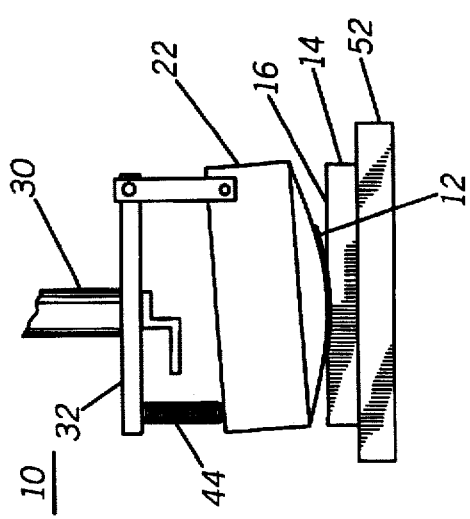
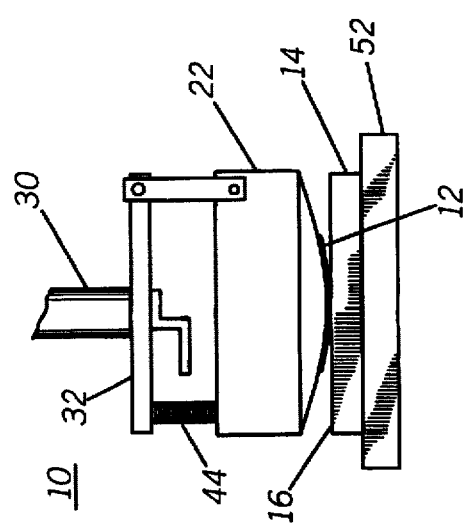
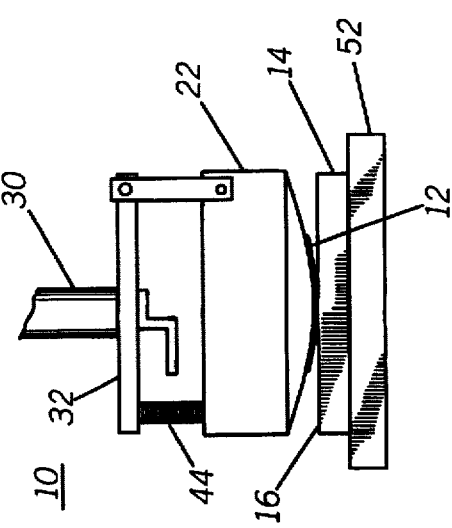

5,733,410

LABELING APPARATUS FOR APPLYING LABELS WITH A ROLLING MOTION

TECHNICAL FIELD

The inventions relates in general to labeling equipment, and more particularly to labeling equipment for applying labels to flat surface and avoiding trapped air between the label and the surface to which the label is applied.

BACKGROUND

Labels are used on a variety of article to display pertinent information to consumers, distributor, and manufacturers. Nearly every article sold in the marketplace uses a label, if not directly on the article, then on the shipping containers. Accordingly, many types of labels and associated labeling systems exist. The choice of which particular system to use depends on a variety of factors including, for example, the environmental conditions the label will experience and the surface to which the label is applied.

One of the more common label systems uses an inexpensive paper label with a glue dispensing fixture to apply glue to the label, article, or both. This type of label is common in the foodstuffs industry, and is typically applied to cylindrical containers. Another type of label which is becoming more frequently used is the "self adhesive" label. This type of label may be paper or polymeric, has an adhesive on a back side, and comes mounted on a low tack release liner so it can be easily removed and placed on a product. The adhesive provides a high tack to the surface of the article so that, unlike the release liner, it is not easily removable from the article, which is especially desirable for warning labels. In such applications where it is desired that the label remain adhered to the article for the life of the product, it is important to achieve a high level of adhesion.

To achieve the highest adhesion between an adhesively backed label, one problem that should be avoided is the trapping of air between the label and the labeling surface of the article. The resulting air "bubbles" reduce the surface contact area between the label and the article's surface. This is typically less of an issue with cylindrically shaped article than those with flat labeling surfaces because a cylindrical article can be easily rotated while the label is applied to eliminate trapped air. This technique is well known in the art. However, for flat surfaced articles, rotating the article while applying the label is of no use. In addition, strict cosmetic requirements in certain markets demand that the label be smooth upon application. If air bubbles are trapped beneath a label, the label may have to be removed, and thus destroyed. This results in a higher cost if it is regularly occurring.

Therefore a need exists for a labeling apparatus which can apply adhesively backed labels to a flat surfaced article while avoiding the trapping of air between the label and the article to maximize the adhesion between the label and the article, and reduce cosmetic defects.

BRIEF DESCRIPTION OF THE DRAWINGS

FIG. 3 is a side view of a labeling apparatus, in accordance with the invention, in a first position of a labeling sequence;

FIG. 4 is a side view of a labeling apparatus, in accordance with the invention, in a second position of a labeling sequence; and FIG. 5 is a side view of a labeling apparatus, in accordance with the invention, in a third position of a labeling sequence.

DETAILED DESCRIPTION OF THE PREFERRED EMBODIMENT

Figure 1:
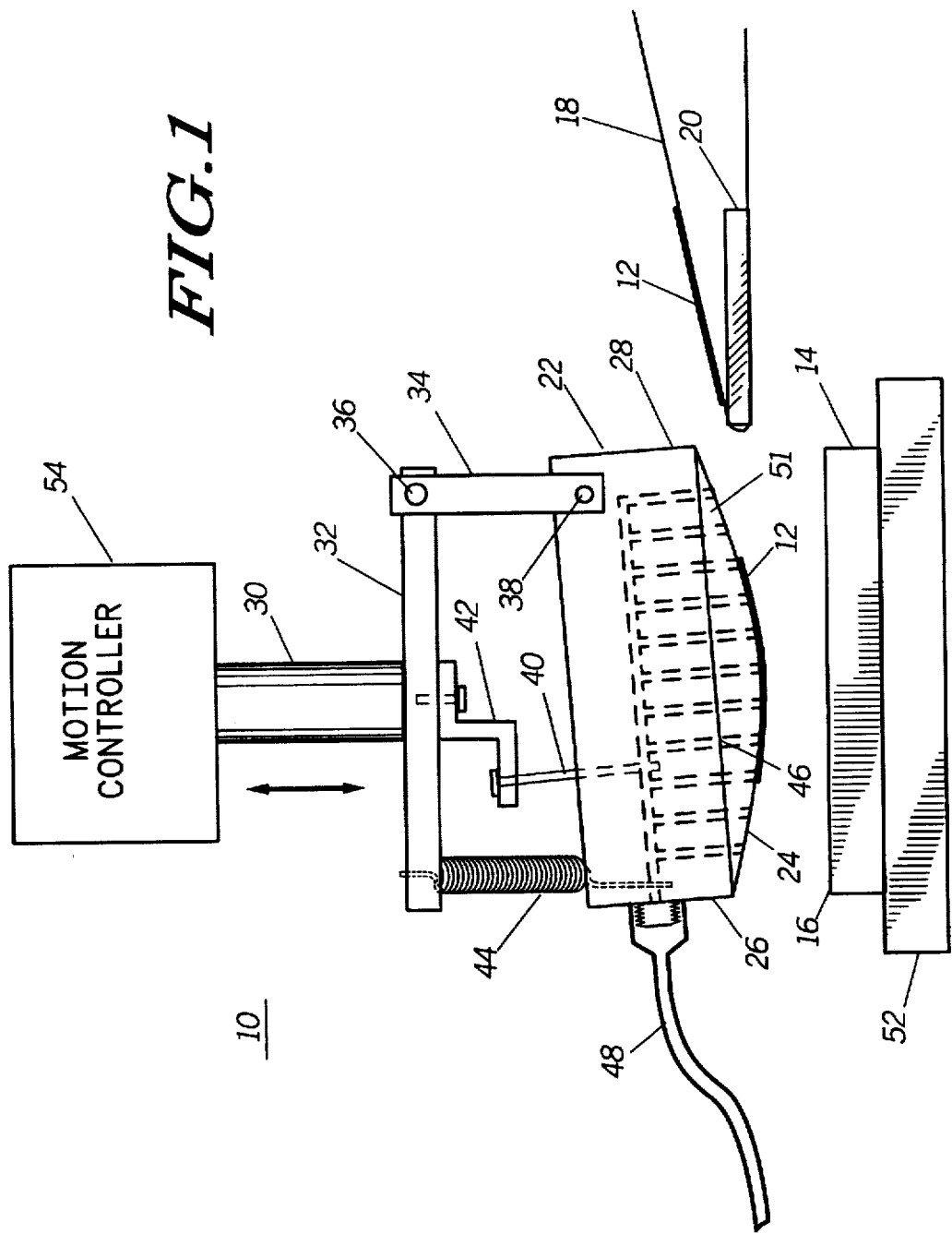
FIG. 1 is a side elevational view of a labeling apparatus in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a side elevational view of a labeling apparatus 10 in accordance with the invention. The labeling apparatus is used to apply a label 12 to an article 14 having a substantially flat labeling surface 16. The label is a typical adhesive backed label fabricated of paper or polymeric stock, and is provided on a release liner 18 which is drawn over a peeler plate 20 located in correspondence with the labeling head 22, as is well known in the art. The labeling head has an applicator surface 24 which has a slight outward curvature, and which is preferably a cylindrical curvature. The labeling head receives and holds the label with the adhesive side of the label toward the article. Additionally, the labeling head has a free end 26 and a pivot end 28.

The labeling head is mounted to a means for moving the labeling head into engagement with the labeling surface 16 of the article, such as, for example, a pneumatic cylinder 30 having a mounting plate 32. At least one bracket 34 is used to mount the labeling head to the means for moving, and is held to the mounting plate 32 by any conventional means, such as a bolt 36, and preferably two bolts. The pivot end 28 of the labeling head 22 is held on the bracket or brackets by a pivot pin 38 which passes through a channel in the labeling head, and allows rotation of the labeling head about the pivot pin. In general, the labeling head is moved in a vertical direction to engage with, and disengage from the article. As such, gravity acts on the labeling head so that the free end is biased away from the means for moving the labeling head. The degree to which the labeling head is initially allowed to rotate, termed the initial angle of bias, is determined by a means for adjusting the initial angle of bias, such as an adjustment screw 40 and adjustment bracket 42, in a manner known in the art. However, to ensure that the labeling head is biased to the desired initial position without relying on gravity, a spring 44 may additionally be used. When the labeling head is in the initial position, as in FIG. 1, the label is received at the applicator surface, and preferably held by a vacuum force exerted through vacuum channels 46 formed therethrough and terminating at the applicator surface. The vacuum force is provided by use of a vacuum hose 48 connected to the labeling head in a manner known in the art.

Figure 2:
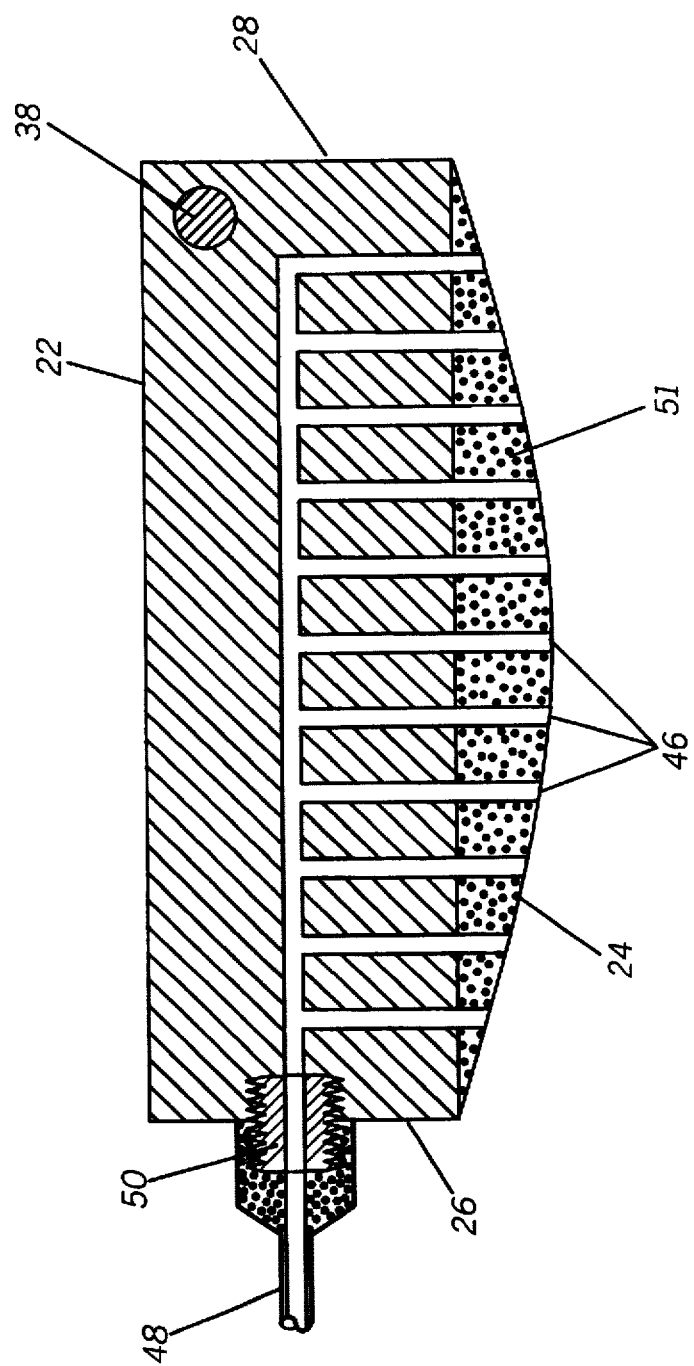
FIG. 2 is a side cut-away view of a labeling head in accordance with the invention.

This can be seen in greater detail in FIG. 2, a side cut-away view of a labeling head 22 in accordance with the invention. Briefly, in FIG. 2, there is shown a vacuum hose 48 connected to the labeling head by any means known in the art, such as a threaded connector 50. A series of vacuum channels 46 are formed therein which terminate at the applicator surface 24, which is preferably the surface of a compliant pad 51, as will be described in further detail hereinbelow. Air is pulled from the openings of the vacuum channels through the labeling head and the vacuum hose to create the necessary vacuum force to hold a label, but not with such force that the adhesion between the label and article is overcome. In other words, the force between the surface of the article and the adhesive of the label is greater than the vacuum force.

In practicing the invention, a further understanding of it's operation should be gained from a perusal of FIGS. 3–5, in conjunction with FIG. 1, where there is illustrated therein a series of views of a labeling apparatus 10 in accordance with the invention. The labeling apparatus starts in an initial position as shown in FIG. 1, where an article has been provided by, for example, a conveyor 52. The labeling head has been positioned in a label receiving position. This is set not only by the vertical position of the labeling head, but also the initial bias angle. In the preferred embodiment, the outward curved surface of the applicator surface is an arc of between 2 and 7 degrees of a circular profile, and the initial angle of bias is about the same so that the portion of the label nearest the free end 26 of the labeling head is tangential and parallel to the labeling surface 16 of the article 14. Then, a motion controller 54 moves the labeling head into initial engagement with the article, as shown in FIG. 3. The portion of the label nearest the free end of the labeling head first contacts the labeling surface of the article. The labeling head is moved further from the position shown in FIG. 3, through the position shown in FIG. 4, to the position shown in FIG. 5, where the pivot end has engaged the article, the labeling head is said to be in complete engagement, and the free end is now disengaged from the article.

Through this sequence the label has been applied to the labeling surface with a substantial rolling motion. By doing so, trapped air bubbles are avoided, and the contact surface area between the label and article is maximized. To aid this process, it is preferable that the applicator surface of the labeling head is the surface of a compliant pad 51. That is, a pad fabricated of a compliant material, such as silicone rubber, that has an outward curvature, is used as the lowermost section of the labeling head. As the labeling head is lowered into full engagement, i.e., when the pivot end reaches its lowest point, a small force is experienced in a direction parallel to the surface of the article, and away from the pivot end. The deformation of the compliant pad relieves this force to some extent, and when coupled with a slight outward curvature of the pad, as opposed to a large outward curvature, virtually eliminate this force.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A labeling apparatus for applying a label to a substantially flat labeling surface of an article, said labeling apparatus comprising:

a labeling head having an applicator surface having an outward curvature for receiving and holding said label; and a means for moving said labeling head into engagement with said labeling surface, wherein said labeling head is pivotally mounted to said means for moving and positioned such that said label is applied to said labeling surface with a rolling motion of said applicator surface as said labeling surface is moved from an initial engagement to a complete engagement, and wherein said labeling head has a pivot end and a free end, said pivot end being pivotally mounted to said means for moving, said free end biased away from said means for moving and being the first portion of said labeling head to engage said article.

2. A labeling apparatus as defined by claim 1, wherein said applicator surface is the surface of a compliant pad.

3. A labeling apparatus as defined by claim 1, wherein said labeling head comprises vacuum channels formed therethrough terminating at said applicator surface for holding said label to said labeling head with a vacuum force.

4. A labeling apparatus as defined by claim 1, wherein said free end of said labeling head is biased away from said means for moving by a spring.

5. A labeling apparatus as defined by claim 4, wherein said labeling head is biased away from said means for moving at a bias angle, and wherein said labeling apparatus further comprises a means for adjusting the bias angle between said labeling head and said means for moving.

6. A labeling apparatus for applying a label to a substantially flat labeling surface of an article, said labeling apparatus comprising:

a labeling head having an applicator surface having an outward curvature for receiving and holding said label;

a pneumatic cylinder for moving said labeling head from a label receiving position into engagement with said labeling surface; and wherein said labeling head is pivotally mounted to said pneumatic cylinder and positioned such that said label is applied to said labeling surface with a rolling motion of said applicator surface as said labeling surface is moved from an initial engagement to a complete engagement.

7. A labeling apparatus as defined by claim 6, wherein said applicator surface is the surface of a compliant pad.

8. A labeling apparatus as defined by claim 6, wherein said labeling head comprises vacuum channels formed therethrough terminating at said applicator surface for holding said label to said labeling head with a vacuum force.

9. A labeling apparatus as defined by claim 6, wherein said labeling head has a pivot end and a free end, said pivot end being pivotally mounted to said pneumatic cylinder, said free end biased away from said pneumatic cylinder and being the first portion of said labeling head to engage said article.

10. A labeling apparatus as defined by claim 9, wherein said free end of said labeling head is biased away from said pneumatic cylinder by a spring.

11. A labeling apparatus as defined by claim 10, wherein said labeling head is biased away from said pneumatic cylinder at a bias angle, and wherein said labeling apparatus further comprises a means for adjusting the bias angle between said labeling head and said pneumatic cylinder.

12. A method of applying a label to a labeling surface of an article with a labeling apparatus, said labeling surface being substantially flat, said labeling apparatus comprising a labeling head having an applicator surface having an outward curvature, a pivot end, and a free end, a pneumatic cylinder for moving said labeling head, and wherein said labeling head is pivotally mounted to said pneumatic cylinder, said free end is biased away from said pneumatic cylinder, said method comprising the steps of:

provided said article;

positioning said labeling head in a label receiving position;

receiving said label at said applicator surface after performing said step of positioning;

moving, with said pneumatic cylinder, said free end of said labeling head into engagement with said labeling surface after performing said step of receiving; and moving, with said pneumatic cylinder, said pivot end of said labeling head into engagement with said labeling surface, thereby applying said label to said labeling surface with a substantial rolling motion after performing said step of moving said free end.

* * * * *